May 29, 1962
W. B. SCHMIDT
3,036,387
APPARATUS AND METHOD FOR PRODUCING THREE-DIMENSIONAL
REPRESENTATIONS OF CHESS SITUATIONS
Filed Nov. 28, 1958
2 Sheets-Sheet 1
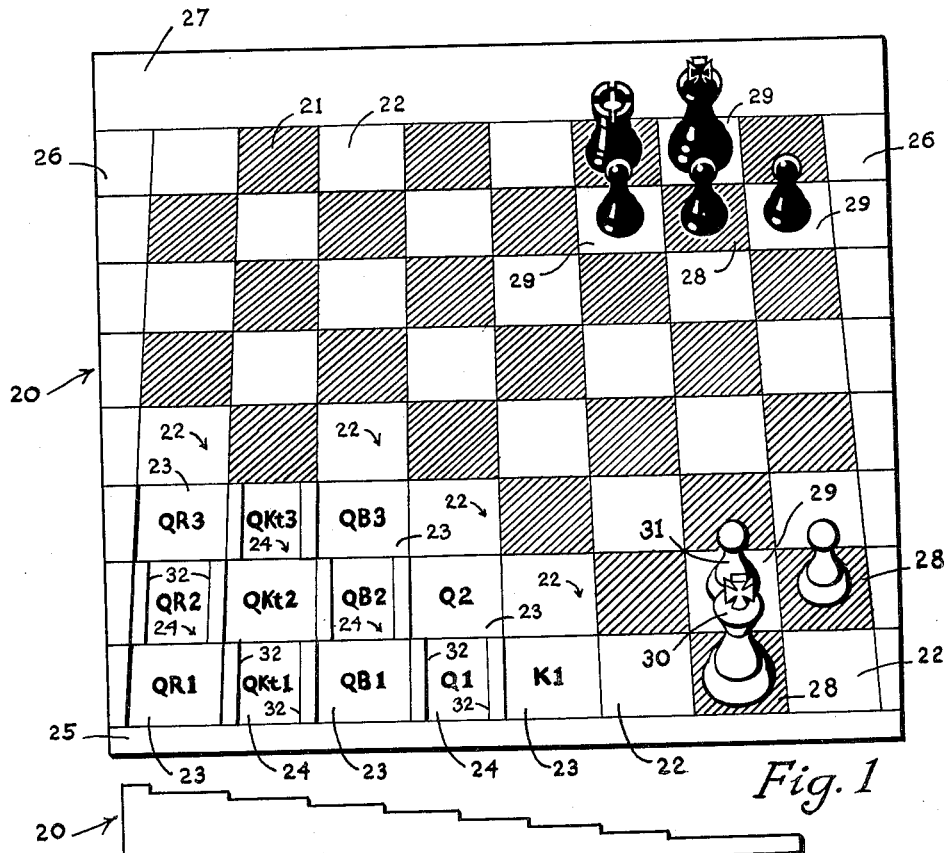
Fig. 1
Fig. 2
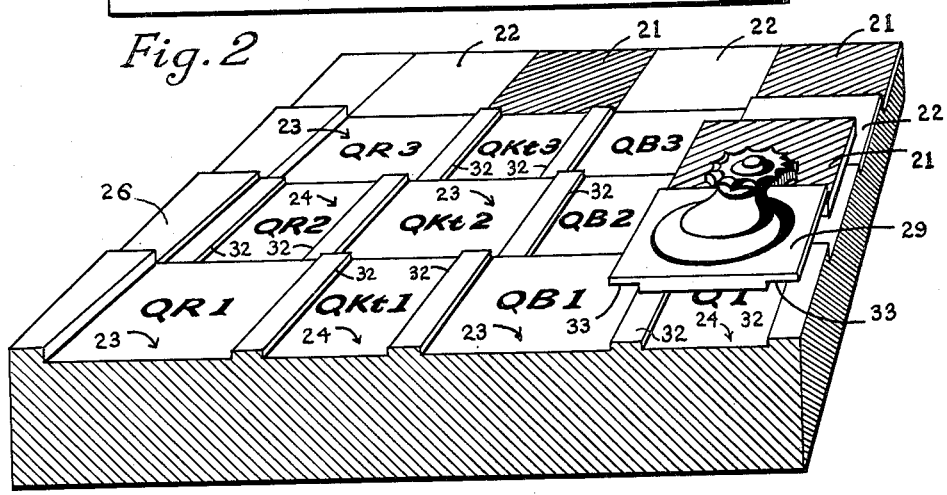
Fig. 3
Werner B. Schmidt INVENTOR.
BY
Edward Halle
ATTY May 29, 1962  W. B. SCHMIDT  3,036,387
APPARATUS AND METHOD FOR PRODUCING THREE-DIMENSIONAL
REPRESENTATIONS OF CHESS SITUATIONS
Filed Nov. 28, 1958  2 Sheets-Sheet 2
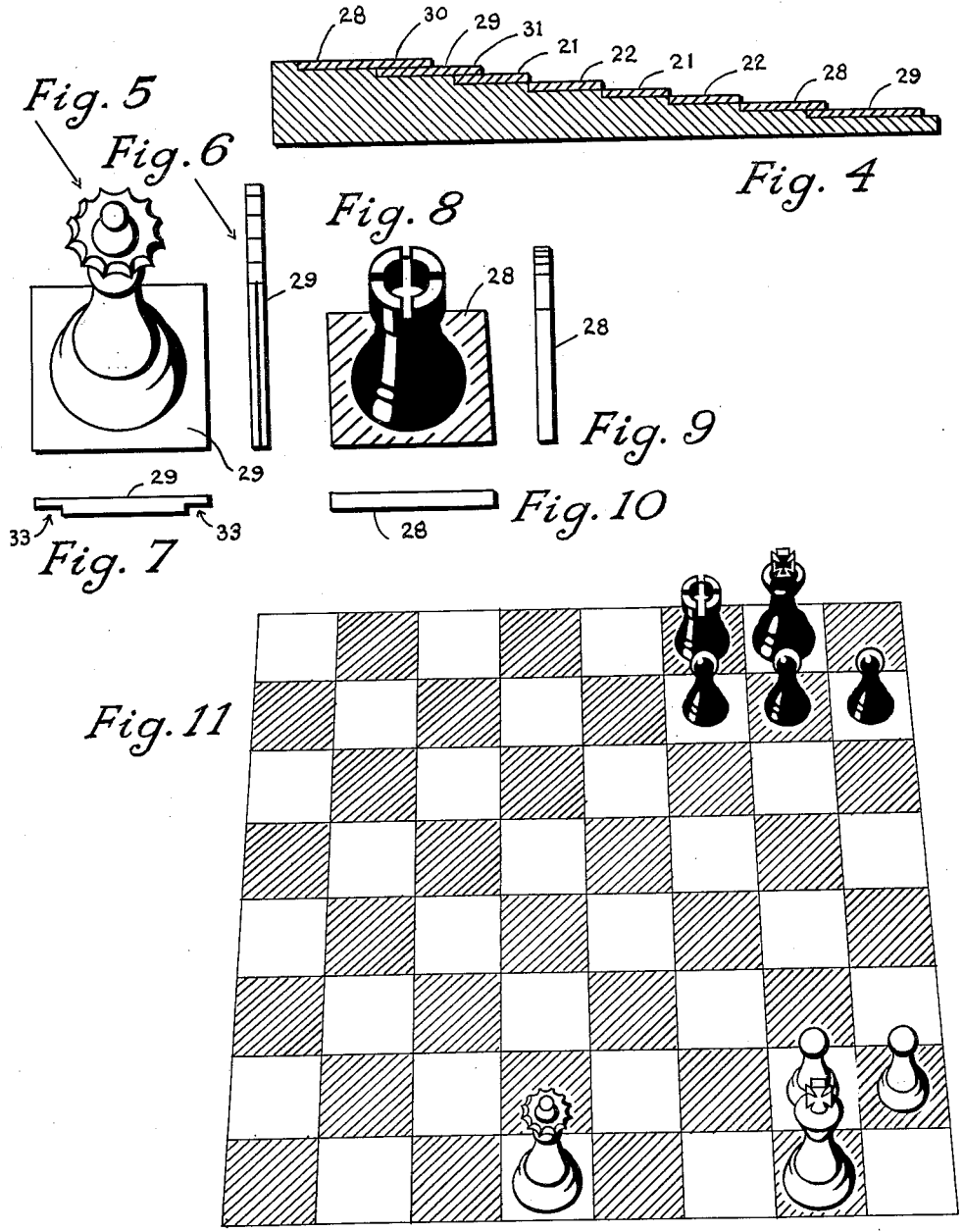
Werner B. Schmidt INVENTOR.
BY
Edward Halle
ATTY United States Patent Office 3,036,387
Patented May 29, 1962

3,036,387
APPARATUS AND METHOD FOR PRODUCING THREE-DIMENSIONAL REPRESENTATIONS OF CHESS SITUATIONS
Werner B. Schmidt, 66 Milton, Rye, N.Y.
Filed Nov. 28, 1958, Ser. No. 776,890
5 Claims. (Cl. 35—49)

My invention relates to an apparatus and method to produce simulated realistic "drawings" representing various chess situations and positions, in three dimensions on two dimensional planes, for illustration purposes, without the necessity of having an artist draw each different situation.

As is well known, a game of chess is played on a chessboard having sixty-four squares, comprising eight horizontal rows (ranks) and eight vertical rows (files), each having eight light and dark alternate squares with a light square at the lower right hand corner of the board. I shall refer to the light squares as white and the dark squares as black.

In the usual game of chess, the chessmen are colored dark and light to differentiate between the sides and for purposes of clarity I will refer to them as black and white. Whenever I refer to a square or a chess piece as black or white, I do not mean to be limited by the precise color black or white but I use the terms to differentiate between the contrasting colors of the squares of the board and the contrasting colors of the pieces of each side of the game.

The vertical rows of squares of the board are called files. The horizontal rows of squares are called ranks. At the start of the game, the first rank of squares before each player contains one king, one queen, two rooks, two bishops and two knights. Each player sets up his pieces on the first rank in front of him in a formation reading from left to right as follows:

Rook, knight, bishop, queen, king, bishop, knight and rook. The positions of the king and queen will vary however, depending on whether or not the pieces are white or black since the white queen is placed on a white square and faces the black queen in the same file which is placed on a black square. Similarly, the white king and black king will face each other along the same file.

The vertical rows of squares or files are named after the pieces which stand in them in the opening position. The horizontal squares or ranks are numbered from one to eight from each side of the board. Thus, in FIG. 1 of the drawings, the files are named queen rook file or as abbreviated QR; queen knight, file, or as abbreviated QKt; queen bishop file, or as abbreviated QB; queen file, or as abbreviated Q; king file, or as abbreviated K, and so on down to the king rook file.

Following this system of notation, each square in each rank will be numbered for rank. Thus again, as shown in FIG. 1, the squares in the first rank bear the number 1, the squares in the second rank the number 2 and the squares in the third rank the number 3. Any given square of the sixty-four squares can thus be located by giving its file and rank such as queen bishop file, third rank, or as abbreviated QB3.

This method of numbering the squares is the usual method used in discussing chess games or problems and in writing or illustrating chess games or problems. Thus an entire chess game can be recorded by showing the moves that each player made from the beginning of the game until its conclusion. Also, special chess problems or portions of games can be recorded by using the above mentioned system.

Virtually all books or articles on chess, in addition to recording the plays or illustrating the plays in the above manner, have illustrations of chess boards, usually in diagram, showing the positions of the pieces at various stages of the game or problem. Prior to my invention these illustrations had to be made individually by an artist for each specific illustration required.

These individually drawn chess board diagrams are then used to illustrate specific articles in newspaper columns, magazines and chess books. It is therefore an object of my invention to provide a method and apparatus for making individual respresentations of chess boards with the necessary pieces in various stages of play without the necessity of having to have each one hand drawn by an artist.

It is a further object of my invention to provide such a method and apparatus which will be quick and easy to assemble and which will result in a fine three dimensional representation of a chess board with pieces on it.

Another object of my invention is to provide such a three dimensional representation which will simulate a fine drawing.

It is also an object of my invention to provide such a method and apparatus which may be operated by an unskilled person who has no knowledge of drawing or perspective.

Further objects and advantages will appear in the specification hereinbelow.

I achieve these objects with the device illustrated in the accompanying drawings in which:

FIG. 1 is a top plan view of the frame of my device partially covered with removable squares;

FIG. 2 is a side elevational view of the frame;

FIG. 3 is a perspective cross sectional view of the lower left hand quarter of FIG. 1 with the front margin removed and the addition of a white and black removable square in extended position over the Q1 and Q2 squares;

FIG. 4 is a cross sectional view taken along a medial line of the king knight file of FIG. 1;

FIG. 5 is a top plan view of a white removable square with a white queen;

FIG. 6 is a side elevation of FIG. 5;

FIG. 7 is a front elevation of FIG. 5;

FIG. 8 is a top plan view of a dark removable square with a black rook;

FIG. 9 is a side elevation of FIG. 8;

FIG. 10 is a front elevation of FIG. 8, and

FIG. 11 is a final printed impression showing a three dimensional representation of a chess board and chess pieces shown in FIG. 1 with the numbered squares in the lower left hand corner covered by removable black and white squares as it would be printed on a sheet or page by means of my apparatus and method.

My apparatus comprises a frame 20 on which I place black removable squares 21 and white removable squares 22. The frame 20 is provided with sixty-four removable square seats 23 and 24. The frame 20 also has a front margin 25 side margins 26 and a rear margin 27.

Half of the removable squares are white 22, and the other half of the removable squares are black 21 to simulate the actual appearance of a chess board which has white and black squares on it. In order to represent chess pieces on the board, I also provide black removable squares 28 and white removable squares 29 having representations of chess figures incorporated in them.

Although my frame 20 and removable squares 21, 22, 28 and 29 when assembled, are substantially two dimensional, they nevertheless give a three dimensional representation when viewed from above because I have provided for an illusion of perspective both in the frame 20 and in the removable squares 21, 22, 28 and 29 in the following manner:

Each succeeding square and file of squares on the frame 20 is made shorter and narrower from the front toward the rear rank according to the one point perspective.

Thus, the side margins 26 converge toward each other from the front towards the rear.

For this purpose I chose as my perspective viewpoint a position well above and in front of the center of the board. However, the perspective can be arranged to view the board from any desired position. The perspective proportions can be worked out in any manner known to the art for the desired result or effect. As a result each seat 23 or 24 is of a different shape from each other seat on the frame and each square 21, 22, 28 or 29 to fit in a seat 23 or 24 will be of a different shape. It is therefore necessary to provide as many removable squares with pieces 28 and 29 for each seat 23 or 24 on the frame 10 as there are different pieces in a chess game. It is also necessary to provide one black removable square 21 for each seat 23 and one white removable square 22 for each seat 24. For example, in order to show the absence of a piece on a black square on seat 23 marked QR1 in FIG. 1, it is necessary to provide a black removable square 21. It is also necessary to have a separate black square 28 with a representation of a black king, a white king, the queen, the bishop, the knight, the rook and the pawn for each square 23. It is also necessary to have a sufficient number of squares 22 and 29 for each seat 24. Thus it would be necessary to provide 752 separate removable squares 28 and 29 and in addition 64 separate white or black dark squares 21 and 22, or a total of 816 removable squares altogether. In making this count of the square pieces required I do not provide for white pawn squares on the first rank, or black pawn squares on the last rank, since these pieces would not appear on the mentioned ranks in any game, or situation, in accordance with the accepted rules of chess; however, these squares may of course be made and provided if desired.

I find it helpful in keeping track of all of these different squares, to place the proper number on the back of each square for the seat on which it is to be placed. For example, all squares 21 and 28 which are designed for seat 23 in the first rank of the queen rook file are numbered QR1. The mentioned seat 23 may also be numbered QR1, as shown in FIG. 1 of the drawings.

In noting and numbering the squares and moves in a regular chess game, the squares on which the white pieces rest are usually numbered in file and rank from the white side of the board and the squares on which the black pieces rest are usually numbered in file and rank from the black side of the board. However, in the present form of my invention I have constructed the apparatus from a perspective viewpoint taken from the white side of the board and in order to keep track of all of the various squares mentioned above, I number them in file and rank from the white side of the board regardless of whether the pieces represented on them are black or white. Thus, each square on my board 20 will have only one number and that number will be in file and rank from the white side of the board.

The illusion of perspective is further created by the removable squares 28 and 29 because the upper part of the chess piece depicted on each of the said squares will overlie the removable square next above it. For example, in FIG. 1 of the drawings, the king 30 shown on the first rank overlies one of the pawns 31 shown in the second rank. Reference to FIG. 4 shows the relative position of these pieces in cross section.

It is also necessary that the chess pieces on the squares 28 and 29 diminish in size from front row to back in the same ratio as the squares on which they stand, and that each individual piece diminish in that same relation according to the laws of perspective. The laws on perspective which I follow and practice in my invention, are clearly set forth in Elements of Drawing and Perspective, by John Ruskin, M.A., New York, Wiley, 1864.

In order to provide a flush mounting for all of the removable squares, I have provided the seats 23 within which the proper removable square fits flush. I have also provided seats 24 having bosses 32 which cooperate with shoulders 33 on the white squares 22 (not shown) and 29. The bosses 32 serve two functions. Firstly, they act as the bosses 32 for the seats 24. Secondly, they act as sides for the adjoining seats 23. The height of each boss 32 is one half of the normal thickness of a removable square 21, 22, 28, 29 and the depth of each shoulder 33 is one half of the normal thickness of said removable squares 21, 22, 28, 29. In order for the pieces (such as king 30 and pawn 31) of the removable squares 28 and 29 to overlie removable squares in the next succeeding rank of the frame 20, it is necessary to adjust the height of each rank in a downward descending fashion so that the second rank is lower than the first rank by the distance of the thickness of any of the removable squares 21, 22, 28, 29. The third rank is again lower than the second rank by the same thickness and so on, until the last rank is reached. This can best be seen in FIG. 4 of the drawings.

As a result of my construction, because each removable square is not a perfect square, when each square is inserted into a seat of the frame, it automatically wedges into position.

For purposes of illustration, I show in FIG. 11 the finished representation made in accordance with my invention, of an illustration for a particular chess situation in which the pieces are set up as follows: white queen on Q1, white king on KKt1, white pawns on KKt2, and KR2, black pawns on KB7, KKt7 and KR7, black rook on KB8 and black king on KKt8.

My method comprises the following steps:

In order to produce the representation as shown in FIG. 11 I start to set up the board 20 as shown in FIGS. 1 and 3. I put squares 28 and 29 for the above named pieces on the corresponding seats 23 and 24. All of the other seats 23 and 24 are covered with removable squares 21 and 22 so that the game board 20 is made complete. (It is understood that I have provided sufficient squares 21, 22, 28 and 29 for each of the seats 23 and 24 so that any representation of any stage of a chess game or chess problem can be duplicated and I use the representation as shown in FIG. 11 merely for purposes of illustration.)

After the board has been set up with the desired squares in place, I then photograph it from above, and develop the photograph in the usual manner; or I may photograph the board from above in any of the usual processes for producing line cuts, half-tone cuts or other types of cuts for printing purposes. The resulting photograph or print will appear as in FIG. 11 of the drawings, and it has the appearance of a carefully drawn representation in three dimensions.

While my process can be used for both ordinary photographs and for prints made by photographic process of any type, I prefer to use it with a line cut process since this is the most economical way of reproducing the representation desired. For this purpose, the photo should be made in pure black and white with no grays.

My device can also be used with any kind of photographic reproduction process or it may be used for illustration purposes before an audience without printing or photographing. It may also be used in conjunction with a device such as an opaque projector for projecting successive plays on a screen during a lecture on chess, or for following the play of famous players in a theatre, or by means of television, during an important tournament. My device may also be used for making motion pictures of chess plays.

While I have described my invention in its preferred forms there are alternate forms in which it can be made and used without departing from the spirit and nature of the invention. For example, the removable squares may be made out of cardboard, or they may be made directly on film or on any other substance and instead of making separate removable squares with chess pieces on them, the pieces may be made separately and placed on squares by means of lugs, magnets or other fasteners. I desire to be protected for all forms of the invention coming within the scope of the claims below.

Wherefore, I claim:

1. The combination of a chess board and removable chess pieces, said board having squares diminishing in size from the front to the last rank and said pieces being of various proportional sizes to fit in proper proportion on the said squares, whereby when the said board has a number of the said pieecs mounted on it and it is viewed from above, the viewer will perceive a three dimensional representation.

2. The combination of a chess board and removable chess pieces, said board having squares arranged in ranks and files and progressively diminishing in depth and width in accordance with the laws of perspective from the front to the rear rank, and said pieces being proportioned to represent various chess pieces, each of said pieces being proportioned in proper perspective for positioning on a particular one of the said squares; whereby when the said board is viewed from above, the viewer will perceive a three dimensional representation.

3. The combination as defined in claim 2, in which the said squares are removable.

4. The combination as defined in claim 2, in which the said squares are removable and some of said squares are without representations of chess pieces and others of said squares have the said proportional representations of the chess pieces combined integrally with the said square.

5. The combination as defined in claim 2, in which each rank of the chess board is lower than the next succeeding rank by a depth approximately equal to the width of the proportional representation of the chess pieces.

References Cited in the file of this patent

UNITED STATES PATENTS

| | | |
|---|---|---|
| 1,036,131 | Mayer | Aug. 20, 1912 |
| 1,427,456 | Giffen | Aug. 29, 1922 |
| 2,010,160 | Meyer | Aug. 6, 1935 |
| 2,463,163 | Dubner | Mar. 1, 1949 |
| 2,551,318 | Drew | May 1, 1951 |
| 2,578,106 | Taylor | Dec. 11, 1951 |

FOREIGN PATENTS

| | | |
|---|---|---|
| 736,986 | France | Sept. 26, 1932 |